United States Patent [19]
Oertley

[11] Patent Number: 5,279,377
[45] Date of Patent: Jan. 18, 1994

[54] TRACK-TYPE VEHICLE UNDERCARRIAGE

[75] Inventor: Thomas E. Oertley, Dunlap, Ill.

[73] Assignee: Caterpillar Inc., Peoria, Ill.

[21] Appl. No.: 44,658

[22] Filed: Apr. 12, 1993

[51] Int. Cl.5 .......................................... B62D 55/00
[52] U.S. Cl. ..................................... 180/9.5; 180/9.1; 180/9.52; 180/9.6
[58] Field of Search ......................... 180/6.64, 6.7, 9.1, 180/9.46, 9.5, 9.52, 9.4, 14.1, 9.6; 280/111, 688

[56] References Cited

U.S. PATENT DOCUMENTS

| | | | |
|---|---|---|---|
| 3,576,226 | 4/1971 | Copeland | 180/9.5 |
| 3,825,088 | 7/1974 | Copeland | 180/9.5 |
| 3,889,769 | 6/1975 | Blomstrom et al. | 180/9.5 |
| 4,364,443 | 12/1982 | Sato et al. | 180/9.5 |

Primary Examiner—Mitchell J. Hill
Attorney, Agent, or Firm—Claude F. White

[57] ABSTRACT

An undercarriage structure for a track-type vehicle has first and second spaced apart roller frame assemblies which are interconnected by a pivot shaft and an equalizer bar. The first and second roller frame assemblies are so arranged with respect to the pivot shaft and the equalizer bar that the roller frame assemblies are substantially non-parallel to each other. This non-parallelism produces either "toe-out" or "toe-in" of the roller frame assemblies, which results in the endless track contacting the track rollers in different areas as the vehicle travels in forward and then reverse directions. The wear life of the endless track is thereby prolonged.

14 Claims, 4 Drawing Sheets

Fig_1.

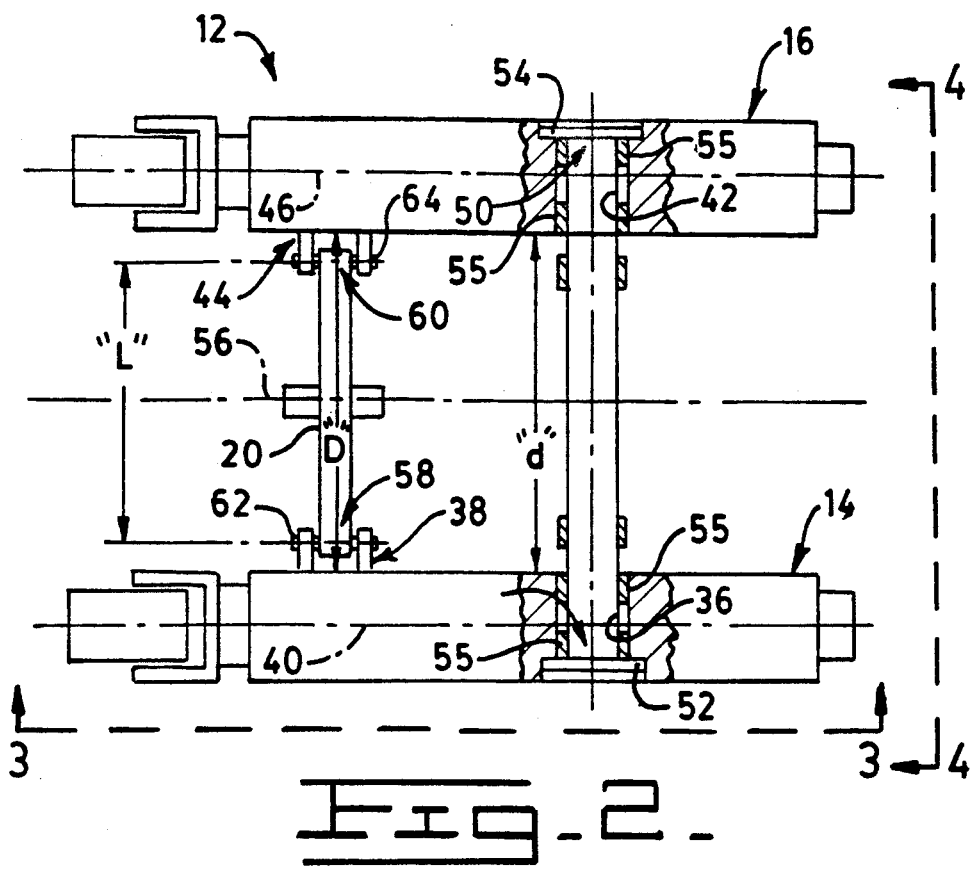
Fig. 2.
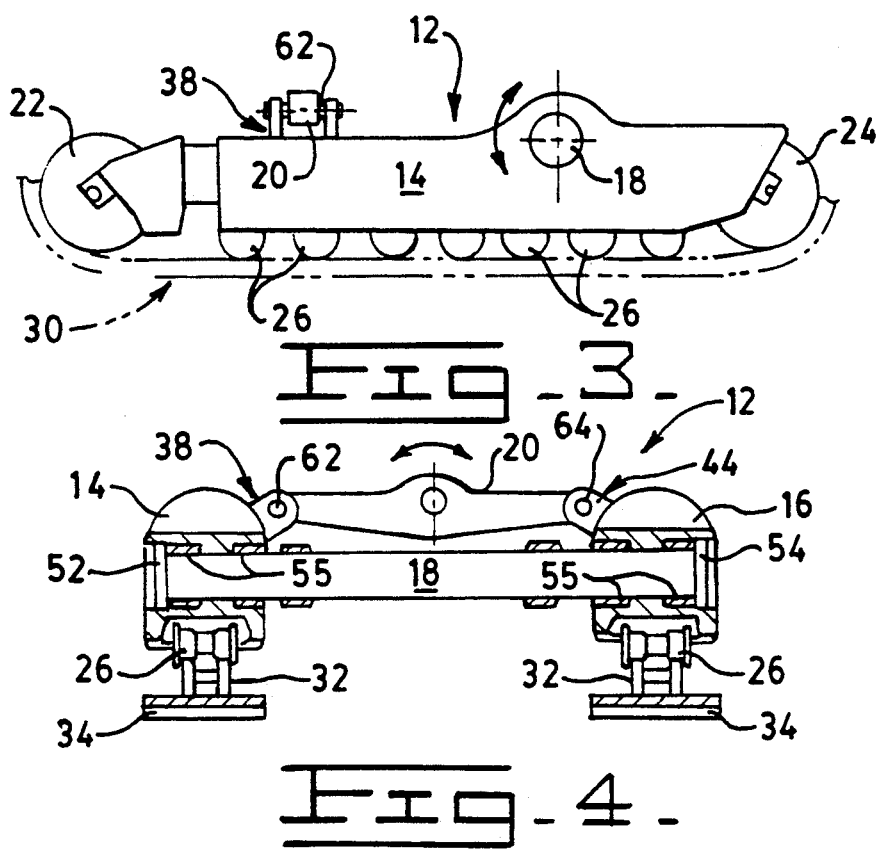
Fig. 3.
Fig. 4.

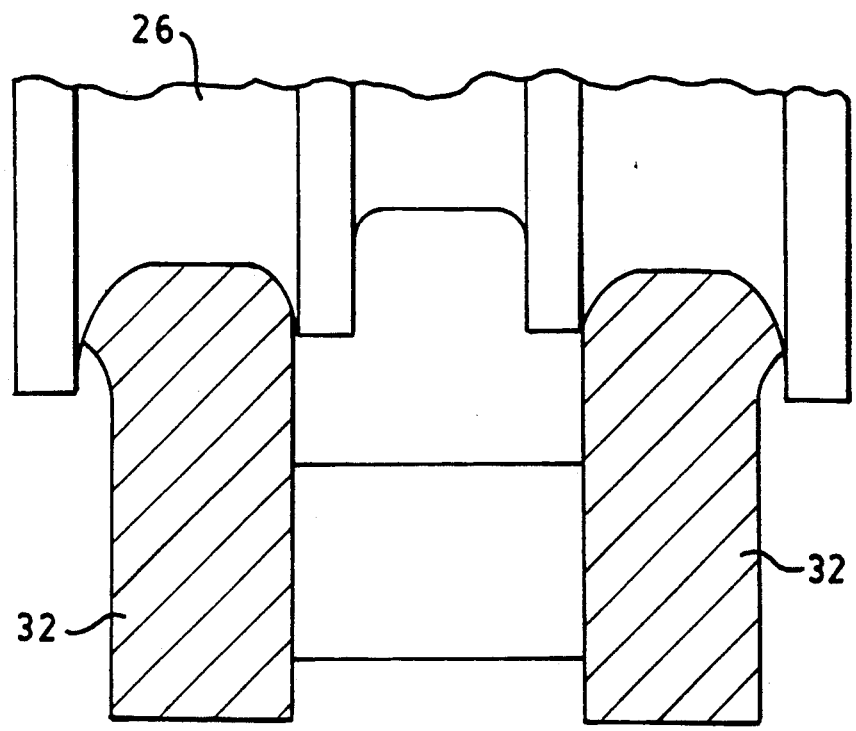
Fig_8_
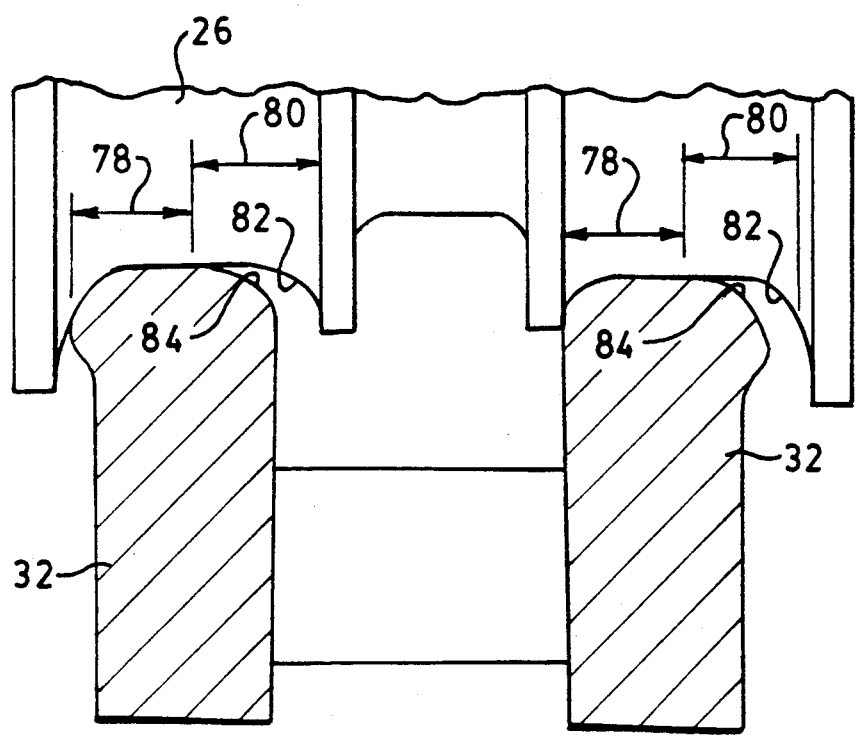
Fig_9_

TRACK-TYPE VEHICLE UNDERCARRIAGE

TECHNICAL FIELD

This invention relates generally to an undercarriage structure for a track-type vehicle and more particularly to an improved undercarriage structure which provides an increase in the wear life of certain undercarriage components.

BACKGROUND ART

Current and prior designs of undercarriage structures for track-type vehicles use design and manufacturing practices which require that the individual left and right track assemblies be parallel with each other. Tight manufacturing and assembly tolerances ensure that the left and right track assemblies are held parallel. This is done in the belief that excessive wear of the track guiding components will occur if the track assemblies are not maintained in parallel relationship. However, with the left and right track assemblies held parallel, the track links bear against the mating track roller treads in a very precise location. As the mating surfaces of the links and rollers wear, the contacting surfaces assume wear profiles which exactly match each other. Therefore, continued operation of the moving undercarriage structure produces wear along the entire contacting surfaces of the links and rollers.

The present invention is directed to overcoming one or more of the problems as set forth above.

DISCLOSURE OF THE INVENTION

In one aspect of the invention, a track-type vehicle has an undercarriage structure which includes first and second spaced roller frame assemblies, a pivot shaft extending between and connected to the roller frame assemblies, and an equalizer bar extending between and supported by the roller frame assemblies. The first and second roller frame assemblies are so arranged with respect to the pivot shaft and the equalizer bar that the first and second roller frame assemblies are substantially non-parallel to each other.

Rapid wear of the moving undercarriage components of self-laying track-type vehicles is a major concern of owners and operators of these vehicles. Many different fixes have been suggested and tried in order to extend the wear lift of the moving undercarriage components. These include various types of guards and shields, various types of replaceable roller treads, and the use of hard materials imbedded in the roller treads and link surfaces. Although some of these fixes have had limited success, most have not proved feasible or economical.

The subject invention provides an undercarriage structure which prolongs the wear life of certain moving components. This is accomplished by ensuring that the mating wear surfaces of the moving components have more than a single wear path during operation of the vehicle and undercarriage structure.

BRIEF DESCRIPTION OF THE DRAWINGS

FIG. 2 is a diagrammatic plan view of an undercarriage assembly incorporating the subject invention;

FIG. 3 is a diagrammatic side elevational view t generally along the lines 3—3 of FIG. 2;

FIG. 4 is a diagrammatic front elevational view taken generally along the lines 4—4 of FIG. 2;

FIG. 8 is a diagrammatic front elevational view, partly in section, of a track roller and mating track links showing a wear pattern of a prior art undercarriage structure; and FIG. 9 is a diagrammatic front elevational view, partly in section, similar to FIG. 8, of a track roller and mating track links showing a wear pattern of an undercarriage structure incorporating the subject invention.

BEST MODE FOR CARRYING OUT THE INVENTION

Figure 1:
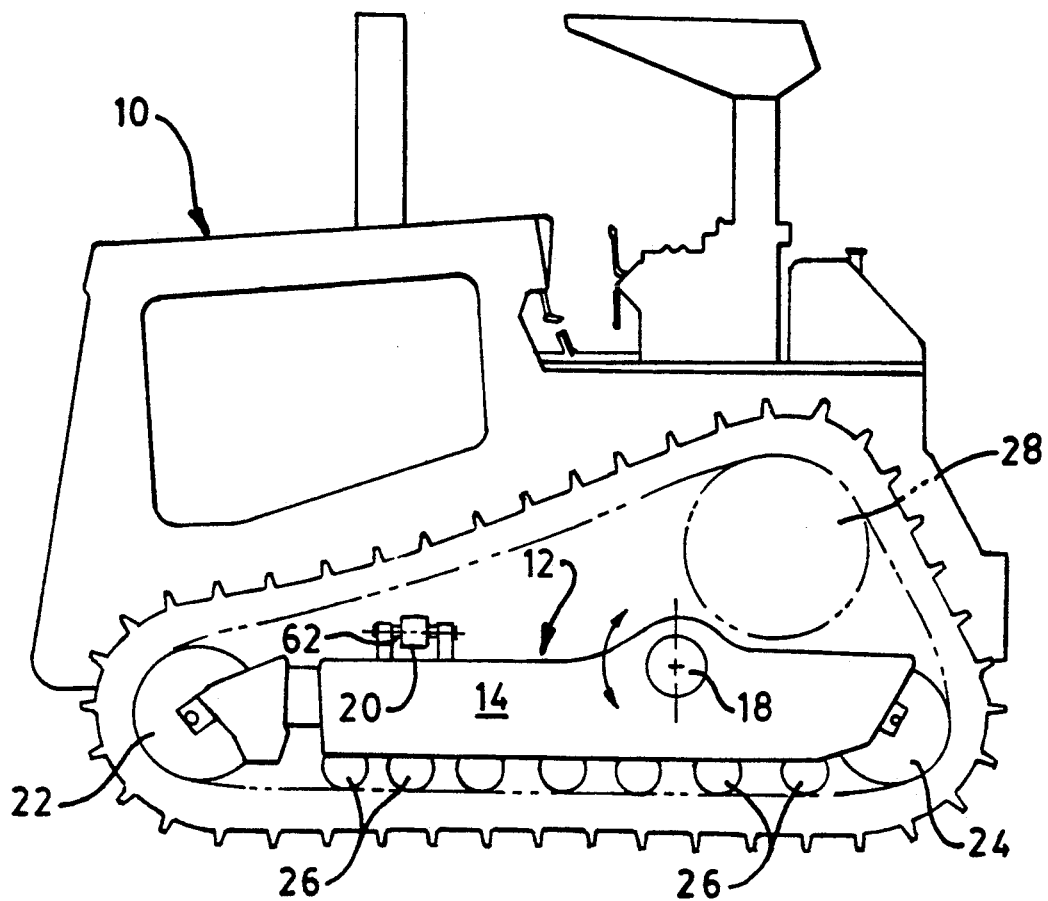
FIG. 1 is a diagrammatic side elevational view of a track-type vehicle incorporating the subject invention.

Referring to the drawings, a track type vehicle 10 has an undercarriage structure 12, including first and second spaced apart roller frame assemblies 14,16, a pivot shaft 18, and an equalizer bar 20. Each of the first and second roller frame assemblies include first and second idler wheels 22,24 and a plurality of guide rollers 26. A drive sprocket wheel 28 is positioned on each side of the vehicle 10 and is powered in forward and reverse directions by the vehicle 10. An endless track chain assembly 30 encircles each drive sprocket 28, the first and second idler wheels 22,24, and the rollers 26. The track chain assembly 30 includes a plurality of interconnected metal track links 32 and a plurality of track shoes 34 secured to the track links 32. The guide rollers 26 guide the track links 32. The guide rollers 26 guide the track links 32 as the track chain assembly 30 is driven by the drive sprocket 28.

With particular reference to FIGS. 1–4, the first roller frame assembly 14 has a first shaft receiving bore 36, a first supporting portion 38, and a first axial centerline 40. The second roller frame assembly 16 has a second shaft receiving bore 42, a second supporting portion 44, and a second axial centerline 46. The pivot shaft 18 extends between the first and second roller frame assemblies and has first and second end portions 48,50 which are adapted to be positioned respectively in the first and second bores 36,42. The pivot shaft 18 is held with the bores 36,42 and connected to the first and second roller frame assemblies 14,16 by first and second retaining plates 52,54, or other suitable means. One or more bearings 55 are positioned within the first and second bores 36,42 and provide oscillation of the pivot shaft 18 with respect to the first and second roller frame assemblies 14,16

The equalizer bar 20, which extends between the first and second roller frame assemblies, has a longitudinally extending central axis 56 and first and second end portions 58,60, which are supported by and connected to the first and second supporting portions 38,44. First and second retaining pins 62,64, or other suitable means, connect the end portions 58,60 respectively to the supporting portions 38,44.

The overall length "L" of the equalizer bar 20 between the retaining pins 62,64 can be varied to make the first longitudinal axial centerline 40 substantially non-parallel to the second axial centerline 46. An increase in the length "L" of the equalizer bar 20 will produce "toe-out" of the undercarriage structure 12. With "toe-out", the distance "D" between the first roller frame assembly 14 and the second roller frame assembly 16 at the equalizer bar position is greater than the distance "d" between the first roller frame assembly 14 and the second roller frame assembly 16 at the pivot shaft position. A decrease in the length "L" of the equalizer bar 20 will produce "toe-in" of the undercarriage structure 12. With "toe-in", the distance "D" is less than the distance "d". With either "toe-out" or "toe-in", the longitudinally extending central axis 56 of the equalizer bar 20 is non-parallel to the first and second axial centerlines 40,46.

The non-parallelism of the first axial centerline 40 to the second axial centerline 46 can be within the range of 0.1 to 5.0 degrees. Preferably, the non-parallelism is in the range of 0.1 to 1.0 degrees. The non-parallelism of the longitudinally extending central axis 56 to the first axial centerline 40 is substantially equal to the non-parallelism between the central axis 56 and the second axial centerline 46. This non-parallelism can be in the range of 0.05 to 2.5 degrees, and is preferably in the range of 0.05 to 0.5 degrees.

Figure 5:
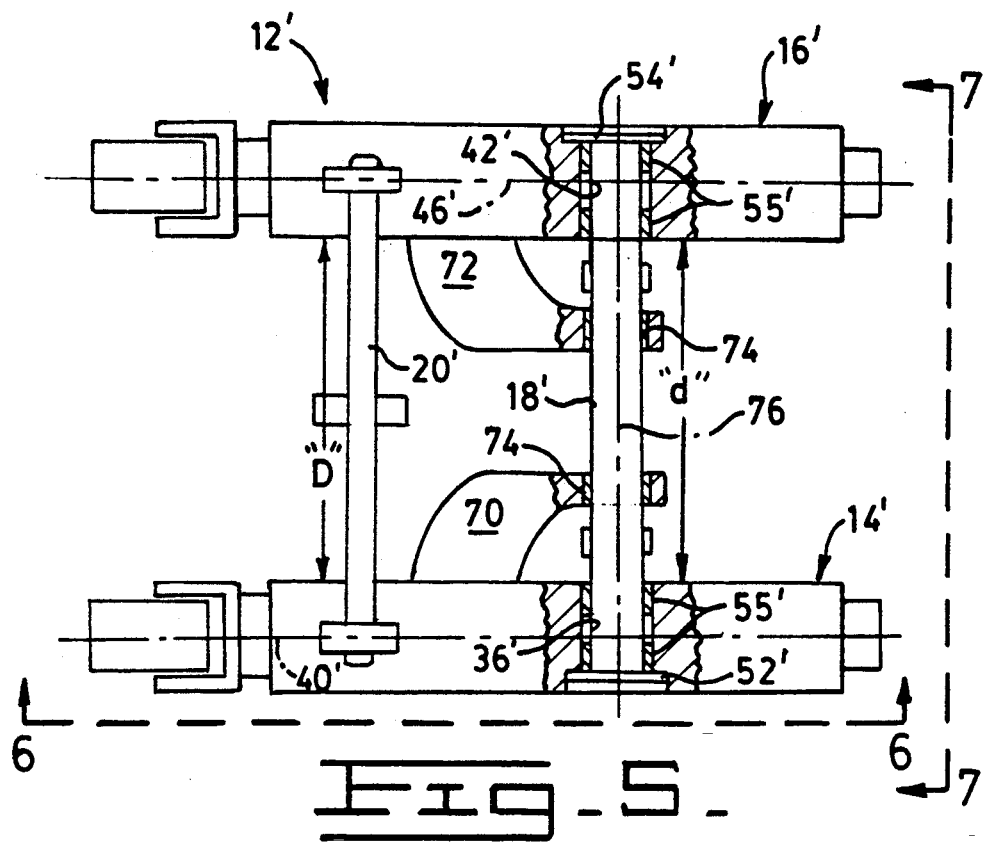
FIG. 5 is a diagrammatic plan view of an alternate embodiment of an undercarriage incorporating the subject invention.
Figure 6:
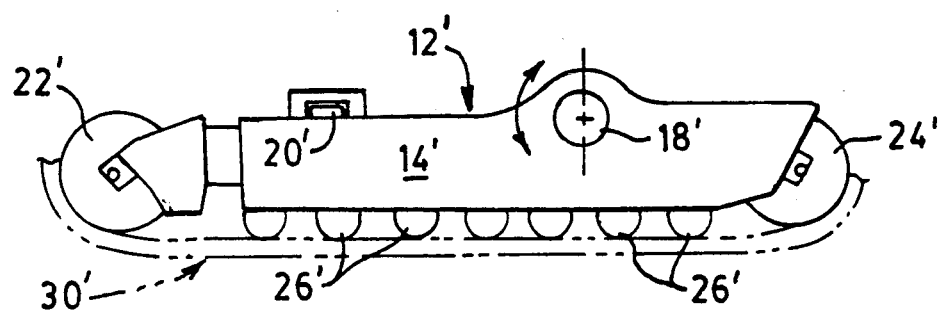
FIG. 6 is a diagrammatic side elevational view taken generally along the lines 6—6 of FIG. 5.
Figure 7:
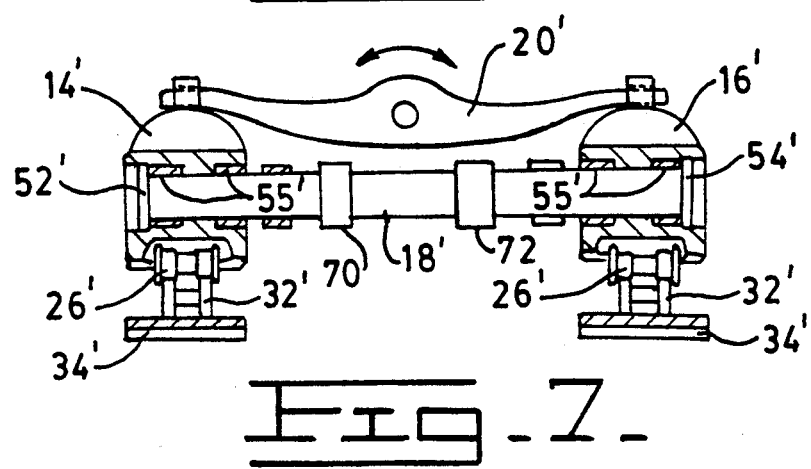
FIG. 7 is a diagrammatic front elevational view taken generally along the lines 7—7 of FIG. 5.

With particular reference to FIGS. 5, 6, and 7, an alternate embodiment of an undercarriage structure is shown. Elements which are similar to the previous embodiment are identified by identical numbers with a prime symbol. In this embodiment, the equalizer bar 20' is not rigidly secured to the first and second track roller frame assemblies 14',16' but bears vertically on the roller frame assemblies 14',16'. First and second diagonal braces 70,72 rigidly connect the first and second roller frame assemblies 14',16' respectively to the pivot shaft 18'. Each of the diagonal braces 70,72 includes a bearing 74, and the first and second roller frame assemblies 14',16' have respective bores 36',42' which house bearings 55'. Each bearing 55' has an axis 76 which is substantially non-perpendicular to the first and second longitudinal axial centerlines 40',46'. The angle "A" formed between the axis 76 and the axial centerlines 40',46' can be varied to change the degree of non-parallelism of the first axial centerline 40' to the second axial centerline 46'. If angle "A" is more than 90 degrees, the undercarriage structure 12' will have "toe-out", and with an angle "A" of less than 90 degrees, the undercarriage structure 12' will have "toe-in".

With particular reference to FIGS. 8 and 9, some wear patterns between the rollers 26 and the track links 32 are shown. FIG. 8 shows a typical wear pattern of a prior art undercarriage structure wherein the roller frame assemblies are maintained substantially parallel to each other. This wear pattern shows that wear takes place along substantially the entire width of the rollers and the links. FIG. 9 shows a typical wear pattern between a roller 26 and a link 32 of an undercarriage structure 12 incorporating the subject invention. This wear pattern shows wear between the roller 26 and the link 32 in the first contact area 78, which would be produced for example when the machine is travelling in a forward direction. When the machine is operated in a reverse direction, the non-parallelism of the roller frame assemblies 14,16, and therefore the track chain assemblies 30, force the rollers 26 against the opposite sides of the links 32. Wear then takes place between the rollers 26 and the links 32 in the second contact area 80. Because the contacting surfaces between the rollers 26 and the links 32 wear to concave and convex profiles, the wear surfaces will not match 100% as the links 32 shift back and forth in the rollers 26. This results in separate contact areas 78,80 for forward and reverse operations of the vehicle 10, which results ultimately in increased life of the rollers 26 and the links 32. The wear life is further enhanced if the rollers 26 are initially manufactured new with a concave profile 82, and the links 32 are manufactured new with a convex profile 84. Current designs of rollers and links use flat (cylindrical) contact surfaces.

Industrial Applicability

With reference to the drawings and the previous detailed description, the subject track-type undercarriage structure 12 is particularly useful for increasing the wear life of certain undercarriage components. With the track roller frame assemblies 14,16 having either "toe-in" or "toe-out", the track links 32 will contact the rollers 26 at the left or right hand portions as the vehicle 10 travels in a forward direction. When the vehicle changes to a reverse direction, the non-parallelism of the undercarriage structure 12 forces the links 32 to the opposite side of the rollers 26 to a separate wear area between the links 32 and the rollers 26. The shifting of the links 32 back and forth in the rollers 26 as the vehicle changes directions creates at least two separate and distinct wear areas between the links 32 and the rollers 26. This results in increased wear life of these undercarriage components, even though the contact pressure between the rollers 26 and the links 32 may be increased. Previous testing has shown that there is not a linear relationship between contact pressure and wear rate.

Other aspects, objects and advantages of this invention can be obtained from a study of the drawings, the disclosure and the appended claims.

I claim:

1. A track-type vehicle having an undercarriage structure, including first and second spaced apart roller frame assemblies; a pivot shaft extending between and connected to said first and second roller frame assemblies, and an equalizer bar extending between and supported by said first and second roller frame assemblies; the improvement comprising:

said first roller frame assembly having a first longitudinal axial centerline and said second roller frame assembly having a second longitudinal axial centerline, said first longitudinal axial centerline being substantially non-parallel with said second longitudinal axial centerline.

2. A vehicle, as set forth in claim 1, wherein the non-parallelism of said first longitudinal axial centerline to said second longitudinal axial centerline is in the range of 0.1 to 5.0 degrees.

3. A vehicle, as set forth in claim 1, wherein the non-parallelism of said first longitudinal axial centerline to said second longitudinal axial centerline is in the range of 0.1 to 1.0 degrees.

4. A vehicle, as set forth in claim 1, wherein the distance "D" between the first roller frame assembly and the second roller frame assembly at the equalizer bar position is greater than the distance "d" between the first roller frame assembly and the second roller frame assembly at the pivot shaft position.

5. A vehicle, as set forth in claim 1, wherein the distance "D" between the first roller frame assembly and the second roller frame assembly at the equalizer bar position is less than the distance "d" between the first roller frame assembly and the second roller frame assembly at the pivot shaft position.

6. A vehicle, as set forth in claim 1, wherein each of said first and second roller frame assemblies include a bore and a bearing received within said bore, said pivot shaft being adapted to be received within said bore and said bearing, said bearing having an axis, said axis being substantially non-perpendicular to said first and second longitudinal axial centerlines.

7. An undercarriage structure for a track-type vehicle, comprising:
- a first roller frame assembly having a first shaft receiving bore, a first supporting portion, and a first axial centerline;
- a second roller frame assembly having a second shaft receiving bore, a second supporting portion, and a second axial centerline; said second roller frame assembly being spaced from said first roller frame assembly;
- a pivot shaft having first and second end portions positioned respectively in said first and second bores and connected to respective first and second roller frame assemblies;
- an equalizer bar having a longitudinally extending central axis and first and second end portions supported by respective first and second supporting portions, said central axis being substantially non-parallel to said first and second axial centerlines.

8. An undercarriage structure, as set forth in claim 7, wherein the non-parallelism of said central axis to said first axial centerlines in in the range of 0.05 to 2.5 degrees and is substantially equal to the non-parallelism of said central axis to said second axial centerline.

9. An undercarriage structure, as set forth in claim 7, wherein the non-parallelism of said central axis to said first axial centerline is in the range of 0.05 to 0.5 degrees and is substantially equal to the non-parallelism of said central axis to said second axial centerline.

10. An undercarriage structure, as set forth in claim 7, wherein the distance "D" between the first roller frame assembly and the second roller frame assembly at the equalizer bar position is greater than the distance "d" between the first roller frame assembly and the second roller frame assembly at the pivot shaft position.

11. An undercarriage structure, as set forth in claim 7, wherein the distance "D" between the first roller frame assembly and the second roller frame assembly at the equalizer bar position is less than the distance "d" between the first roller frame assembly and the second roller frame assembly at the pivot shaft position.

12. An undercarriage structure, as set forth in claim 7, including a plurality of rollers and a plurality of track links, said rollers being associated with said first and second roller frame assemblies, each of said rollers having a tread portion having a concave profile, each of said track links having a rail surface having a convex profile, said rail surfaces being adapted to contact said tread portions.

13. An undercarriage structure, as set forth in claim 7, including a plurality of rollers associated with said first and second roller frame assemblies, each of said rollers having a tread portion having a concave profile.

14. An undercarriage structure, as set forth in claim 7, including a plurality of track links, each track link having a rail surface having a convex profile.

* * * * *